US012650829B2

(12) United States Patent
Zhou et al.

(10) Patent No.: US 12,650,829 B2
(45) Date of Patent: Jun. 9, 2026

(54) SYSTEMS AND METHODS FOR DETECTION OF SOFTWARE VULNERABILITY FIX

(71) Applicant: Huawei Technologies Co., Ltd., Shenzhen (CN)

(72) Inventors: Jiayuan Zhou, Kista (SE); Michael Pacheco, Toronto (CA); Xin Xia, Hangzhou (CN); Yuan Wang, Kingston (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 18/468,126

(22) Filed: Sep. 15, 2023

(65) Prior Publication Data

US 2024/0004638 A1      Jan. 4, 2024

Related U.S. Application Data

(63) Continuation of application No. PCT/CN2021/104675, filed on Jul. 6, 2021.

(51) Int. Cl.
G06F 8/65 (2018.01)
G06F 21/57 (2013.01)

(52) U.S. Cl.
CPC .............. G06F 8/65 (2013.01); G06F 21/577 (2013.01); G06F 2221/033 (2013.01)

(58) Field of Classification Search
CPC .... G06F 8/65; G06F 21/577; G06F 2221/033; G06F 8/427; G06F 8/71; G06N 3/0455; G06N 3/084
See application file for complete search history.

(56) References Cited

U.S. PATENT DOCUMENTS

| | | | |
|---|---|---|---|
| 11,074,062 B1* | 7/2021 | Hosic | G06N 3/08 |
| 2019/0287029 A1 | 9/2019 | Sobran | |

(Continued)

FOREIGN PATENT DOCUMENTS

| | | |
|---|---|---|
| CN | 109376092 A | 2/2019 |
| CN | 109416719 A | 3/2019 |

(Continued)

OTHER PUBLICATIONS

International Search Report for PCT/CN2021/104675 Dated Mar. 21, 2022.

(Continued)

*Primary Examiner* — Patrice L Winder

(57) ABSTRACT

Methods and systems are described for detecting and reporting a vulnerability fix in a code repository. A commit obtained from the code repository is preprocessed to generate file-level token sequences each representing a file-level code change for respective files. Respective file-level code change embedding vectors are generated by inputting each file-level token sequence into a transformer model, each file-level code change embedding vector being a vector representation of the file-level code change for the respective file. The file-level code change embedding vectors are combined into a commit-level code change embedding vector that represents all code changes contained in the commit. A predicted commit-level vulnerability fix score is generated by inputting the commit-level code change embedding vector into a classifier. A vulnerability fix report is outputted, containing an identification of the commit and the predicted commit-level vulnerability fix score.

20 Claims, 6 Drawing Sheets

(56) References Cited

U.S. PATENT DOCUMENTS

| | | | | |
|---|---|---|---|---|
| 2019/0391892 A1* | 12/2019 | Sabharwal | | G06N 20/00 |
| 2020/0225945 A1* | 7/2020 | Wright | | G06F 8/77 |
| 2020/0371778 A1* | 11/2020 | Ni | | G06N 3/08 |
| 2021/0035025 A1* | 2/2021 | Kalluri | | G06N 20/00 |
| 2021/0124830 A1 | 4/2021 | Dinh et al. | | |
| 2021/0357307 A1* | 11/2021 | Deng | | G06N 3/088 |
| 2022/0083450 A1* | 3/2022 | Geddes | | G06F 21/57 |
| 2022/0108020 A1* | 4/2022 | Dang | | G06F 21/577 |
| 2022/0244937 A1* | 8/2022 | Prasad | | G06N 3/08 |
| 2022/0245056 A1* | 8/2022 | Clement | | G06N 3/084 |
| 2022/0269795 A1* | 8/2022 | Balasubramanian | | |
| | | | | G06F 21/577 |

FOREIGN PATENT DOCUMENTS

| | | | |
|---|---|---|---|
| CN | 111459799 A | 7/2020 | |
| CN | 112685739 A | 4/2021 | |

OTHER PUBLICATIONS

Zhou, J,. et al. "Finding a Needle in a Haystack: Automatic Mining of Silent Vulnerability Fixes", Singapore Management University, 2021.

Sabetta, A and Bezzi, M. "A Practical Approach to the Automatic Classification of Security-Relevant Commits", 34th IEEE International Conference, 2018.

Zhou, Y and Sharma, A. "Automated Identification of Security Issues form Commit Messages and Bug Reports" ESEC, 2017.

Chen, Y et al. "A Machine Learning Approach for Vulnerability Curation", IEEE 17th International Conference on Mining Software Repositories (MSR), 2020.

Achyudh Ram et al., Exploiting Token and Path-Based Representations Ofcode for Identifying Security-Relevant Commits, Nov. 15, 2019, total 8 pages.

* cited by examiner

300

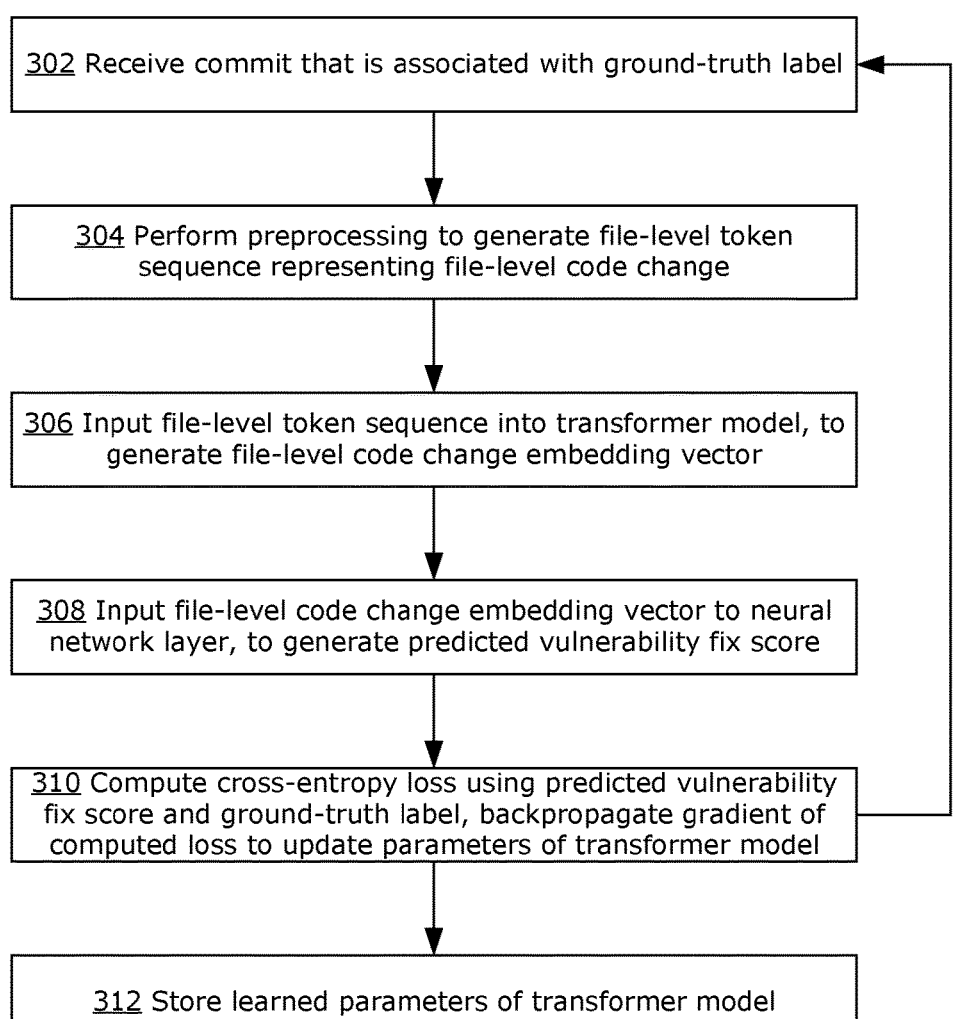

302 Receive commit that is associated with ground-truth label

304 Perform preprocessing to generate file-level token sequence representing file-level code change 306 Input file-level token sequence into transformer model, to generate file-level code change embedding vector 308 Input file-level code change embedding vector to neural network layer, to generate predicted vulnerability fix score 310 Compute cross-entropy loss using predicted vulnerability fix score and ground-truth label, backpropagate gradient of computed loss to update parameters of transformer model 312 Store learned parameters of transformer model Iterate until convergence

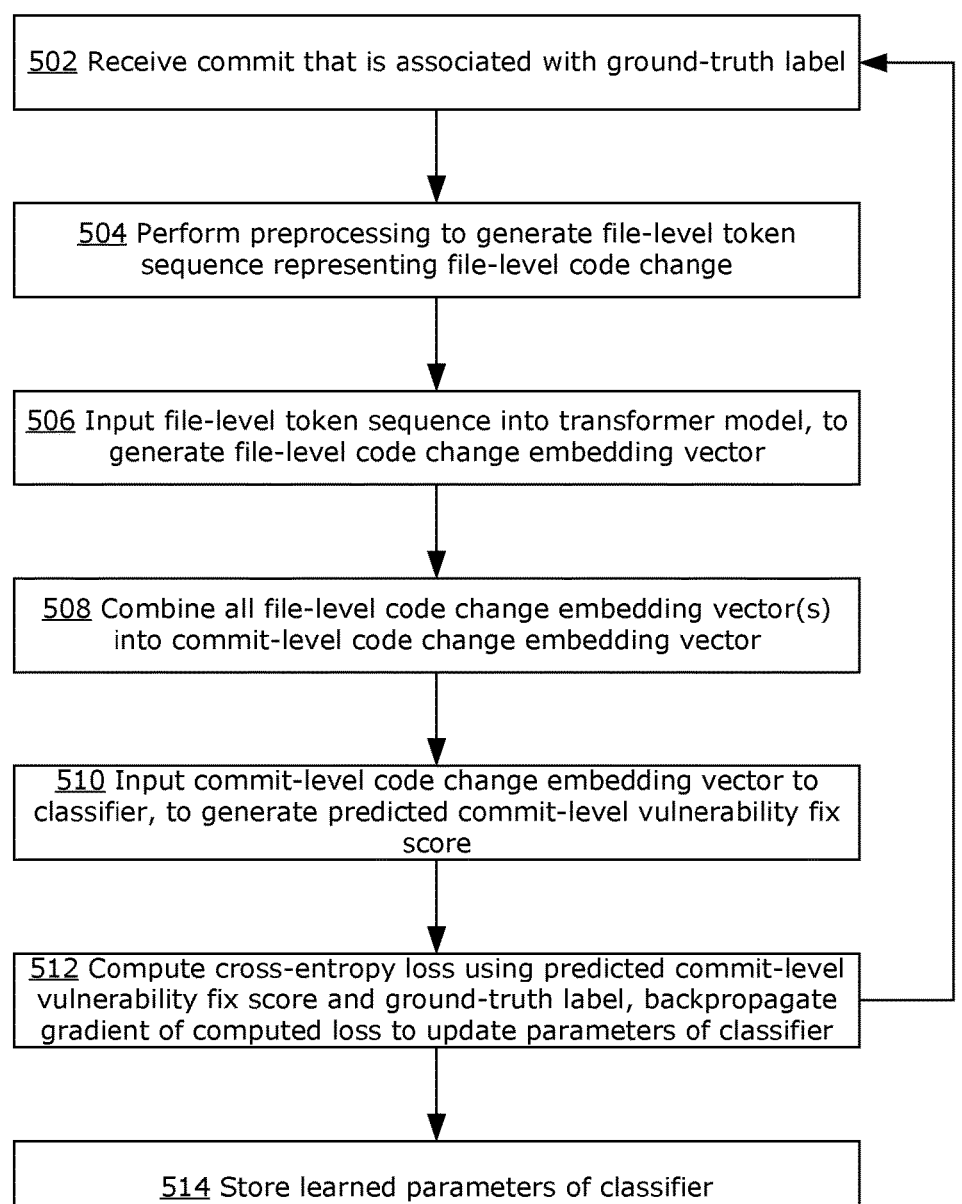

502 Receive commit that is associated with ground-truth label

504 Perform preprocessing to generate file-level token sequence representing file-level code change 506 Input file-level token sequence into transformer model, to generate file-level code change embedding vector 508 Combine all file-level code change embedding vector(s) into commit-level code change embedding vector 510 Input commit-level code change embedding vector to classifier, to generate predicted commit-level vulnerability fix score 512 Compute cross-entropy loss using predicted commit-level vulnerability fix score and ground-truth label, backpropagate gradient of computed loss to update parameters of classifier 514 Store learned parameters of classifier Iterate until convergence

FIG. 5

SYSTEMS AND METHODS FOR DETECTION OF SOFTWARE VULNERABILITY FIX

CROSS-REFERENCE TO RELATED APPLICATIONS

The present disclosure is a continuation application of International Application No. PCT/CN2021/104675 entitled "SYSTEMS AND METHODS FOR DETECTION OF SOFTWARE VULNERABILITY FIX", filed Jul. 6, 2021, the entirety of which is hereby incorporated by reference.

TECHNICAL FIELD

The present disclosure relates to systems and methods for detecting a software vulnerability fix, in particular for automatically detecting whether a commit in a code repository contains code for fixing a software vulnerability.

BACKGROUND

Software developers often make use of open source software (OSS) as a foundation for developing new software. However, any vulnerabilities in any OSS file (e.g., any standalone OSS software, any OSS routine or any OSS subroutine) may also propagate to any software that is developed using that file. It is important that, after a vulnerability in a OSS file is found, a software fix for that vulnerability (also referred to as a vulnerability fix) is developed, submitted to the code repository, and applied to all affected software (e.g., all software developed using that OSS code) as quickly as possible. Any delay in applying a software fix can result in a malicious party exploiting the vulnerability to attack an affected software.

An existing approach to OSS vulnerability management is referred to as the response disclosure model. In this approach, the user of a file (i.e., a user who uses a OSS file to develop software) typically relies on a developer of the file (e.g., a OSS vendor) to report the vulnerability fix via a vulnerability advisory, so that the user can be alerted to the presence of a vulnerability fix in the code repository and apply the vulnerability fix to the user's affected software. A problem arises when the user of the file is not aware of a vulnerability fix, or is not aware of the vulnerability fix quickly enough to avert a possible exploitation of the vulnerability. This problem is exacerbated by the fact that not all vulnerability fixes are reported.

Accordingly, it would be useful to provide a solution that can detect the presence of a vulnerability fix in the code repository, without relying on a vulnerability advisory.

SUMMARY

In various examples, the present disclosure describes systems and methods that enables automatic detection and identification of a vulnerability fix. In particular, the vulnerability fix is detected and identified directly from the lines of code in a commit, rather than relying on a vulnerability advisory or on artefacts in the commit.

The disclosed systems and methods make use of a transformer model to generate embedding vectors that represent code changes in a commit. Using the embedding vector, a classifier neural network can classify whether or not the commit is a vulnerability fix, and a vulnerability fix report is generated. This provides the technical advantage that a code repository can be monitored and a vulnerability fix can be automatically detected from the lines of code in a commit, as soon as the vulnerability fix is submitted to a code repository.

In some examples, the disclosed systems and methods use a transformer model to generate file-level code change embedding vectors that represent the semantic meaning of file-level code changes in a commit. The file-level code change embedding vectors are then combined into a commit-level code change embedding vector that represents the semantic meaning of all code changes in the commit. The commit-level code change embedding vector is then processed by a trained classifier to generate a predicted vulnerability fix score indicating the likelihood that the commit is a vulnerability fix. In this way, the likelihood that a given commit is a vulnerability fix may be determined based on the code in the commit, rather than relying on a vulnerability advisory or on artefacts in the commit.

In some examples, a vulnerability fix report may be generated, which reports the predicted vulnerability fix score for a given commit. The vulnerability fix report may also include vulnerability fix information for the given commit, based on similarity of the given commit to a known vulnerability fix (e.g., identified from a known vulnerability fix database). This may provide the technical advantage that a vulnerability fix report may be automatically populated with useful information that a user may use to decide whether or not to apply a commit.

In some examples, the disclosed system and methods may enable information about the detected vulnerability fix to be determined, based on similarity with known vulnerability fixes. This provides the technical advantage that not only is a vulnerability fix automatically detected, the detected vulnerability fix can also be automatically identified.

In an example aspect, the present disclosure describes a method including: obtaining a commit from a code repository; preprocessing the commit to generate one or more file-level token sequences each representing at least one file-level code change for respective one or more files; generating respective one or more file-level code change embedding vectors by inputting each of the one or more file level token sequences into a transformer model, each respective file-level code change embedding vector being a vector representation of the at least one file-level code change for the respective file; combining the one or more file-level code change embedding vectors into a commit-level code change embedding vector that is a vector representation of all code changes contained in the commit; generating a predicted commit-level vulnerability fix score by inputting the commit level code change embedding vector into a classifier; and outputting a vulnerability fix report containing an identification of the commit and the predicted commit-level vulnerability fix score associated with the commit.

In the preceding example aspect of the method, the method may further include: identifying, from an embedding vector database, one or more embedding vectors that are most similar to the commit-level code change embedding vector, the one or more identified embedding vectors being associated with respective one or more unique identifiers; identifying, from a known vulnerability fix database, one or more known vulnerability fixes corresponding to the respective one or more unique identifiers; and extracting vulnerability fix information for each of the identified one or more known vulnerability fixes from the known vulnerability fix database. The extracted vulnerability fix information may be associated with the commit and included in the vulnerability fix report.

In any of the preceding example aspects of the method, each of the one or more file-level token sequences may include a key token; and the transformer model may process each given file-level token sequence by encoding each token in the given file-level token sequence into a respective embedding vector, where the embedding vector encoded from the key token may be the file-level code change embedding vector for the given file-level token sequence.

In the preceding example aspect of the method, preprocessing the commit may include: parsing the commit to extract any lines of added code for a given file, and tokenizing any lines of added code into a sequence of added code tokens; parsing the commit to extract any lines of removed code for the given file, and tokenizing any lines of removed code into a sequence of removed code tokens; parsing the commit to extract any code description, and tokenizing any code description into a sequence of description tokens; and concatenating the sequence of description tokens, the sequence of added code tokens and the sequence of removed code tokens, and appending the key token, to generate the file-level token sequence representing code change for the given file.

In any of the preceding example aspects of the method, the method may further include: monitoring the code repository to detect any commit that is new to the code repository; and obtaining the commit from the code repository in response to detection that the commit is new.

In any of the preceding example aspects of the method, the transformer model may be fine-tuned from a pre-trained language model that has been pre-trained to generate embedding vectors representing human language. The transformer model may be fine-tuned to generate the one or more file-level code change embedding vectors representing software code changes.

In the preceding example aspect of the method, the method may further include, prior to obtaining the commit from the code repository: fine-tuning the transformer model from the pre-trained language model to generate file-level code change embedding vectors using a training dataset; and training the classifier to generate commit-level vulnerability fix scores using the training dataset.

In any of the preceding example aspects of the method, combining the one or more file-level code change embedding vectors into the commit-level code change embedding vector may include averaging the one or more file-level code change embedding vectors.

In any of the preceding example aspects of the method, combining the one or more file-level code change embedding vectors into the commit-level code change embedding vector may include, for each vector element of the commit-level code change embedding vector, taking a maximum value of a corresponding vector element across all of the one or more file-level code change embedding vectors.

In another example aspect, the present disclosure describes a system including: a processing unit configured to execute instructions to cause the system to: obtain a commit from a code repository; preprocess the commit to generate one or more file-level token sequences each representing at least one file-level code change for respective one or more files; generate respective one or more file-level code change embedding vectors by inputting each of the one or more file level token sequences into a transformer model, each respective file-level code change embedding vector being a vector representation of the at least one file-level code change for the respective file; combine the one or more file-level code change embedding vectors into a commit-level code change embedding vector that is a vector representation of all code changes contained in the commit; generate a predicted commit-level vulnerability fix score by inputting the commit level code change embedding vector into a classifier; and output a vulnerability fix report containing an identification of the commit and the predicted commit-level vulnerability fix score associated with the commit.

In the preceding example aspect of the system, the processing unit may be further configured to execute instructions to cause the system to: identify, from an embedding vector database, one or more embedding vectors that are most similar to the commit-level code change embedding vector, the one or more identified embedding vectors being associated with respective one or more unique identifiers; identify, from a known vulnerability fix database, one or more known vulnerability fixes corresponding to the respective one or more unique identifiers; and extract vulnerability fix information for each of the identified one or more known vulnerability fixes from the known vulnerability fix database. The extracted vulnerability fix information may be associated with the commit and included in the vulnerability fix report.

In any of the preceding example aspects of the system: each of the one or more file-level token sequences may include a key token; and the transformer model may process each given file-level token sequence by encoding each token in the given file-level token sequence into a respective embedding vector. The embedding vector encoded from the key token may be the file-level code change embedding vector for the given file-level token sequence.

In the preceding example aspect of the system, the processing unit may be further configured to execute instructions to cause the system to preprocess the commit by: parsing the commit to extract any lines of added code for a given file, and tokenizing any lines of added code into a sequence of added code tokens; parsing the commit to extract any lines of removed code for the given file, and tokenizing any lines of removed code into a sequence of removed code tokens; parsing the commit to extract any code description, and tokenizing any code description into a sequence of description tokens; and concatenating the sequence of description tokens, the sequence of added code tokens and the sequence of removed code tokens, and appending the key token, to generate the file-level token sequence representing code change for the given file.

In any of the preceding example aspects of the system, the processing unit may be further configured to execute instructions to cause the system to: monitor the code repository to detect any commit that is new to the code repository; and obtain the commit from the code repository in response to detection that the commit is new.

In the preceding example aspect of the system, the system may be part of a monitoring system for monitoring the code repository.

In any of the preceding example aspects of the system, the transformer model may be fine-tuned from a pre-trained language model that has been pre-trained to generate embedding vectors representing human language. The transformer model may be fine-tuned to generate the one or more file-level code change embedding vectors representing software code changes.

In the preceding example aspect of the system, the processing unit may be further configured to execute instructions to cause the system to, prior to obtaining the commit from the code repository: fine-tune the transformer model from the pre-trained language model to generate file-level code change embedding vectors using a training dataset; and train the classifier to generate commit-level vulnerability fix scores using the training dataset.

In any of the preceding example aspects of the system, combining the one or more file-level code change embedding vectors into the commit-level code change embedding vector may include averaging the one or more file-level code change embedding vectors.

In any of the preceding example aspects of the system, combining the one or more file-level code change embedding vectors into the commit-level code change embedding vector may include, for each vector element of the commit-level code change embedding vector, taking a maximum value of a corresponding vector element across all of the one or more file-level code change embedding vectors.

In another example aspect, the present disclosure describes a computer readable medium having instructions encoded thereon, wherein the instructions, when executed by a processing unit of a system, cause the system to perform any of the preceding example aspects of the method.

In another example aspect, the present disclosure describes a computer program including instructions which, when the program is executed by a computer, cause the computer to carry out any of the preceding example aspects of the method.

BRIEF DESCRIPTION OF THE DRAWINGS

Reference will now be made, by way of example, to the accompanying drawings which show example embodiments of the present application, and in which:

FIG. 3 is a flowchart illustrating an example method for training a transformer model of a vulnerability fix detection system, in accordance with examples of the present disclosure;

FIG. 5 is a flowchart illustrating an example method for training a classifier of a vulnerability fix detection system, in accordance with examples of the present disclosure.

Similar reference numerals may have been used in different figures to denote similar components.

DETAILED DESCRIPTION

Figure 1:
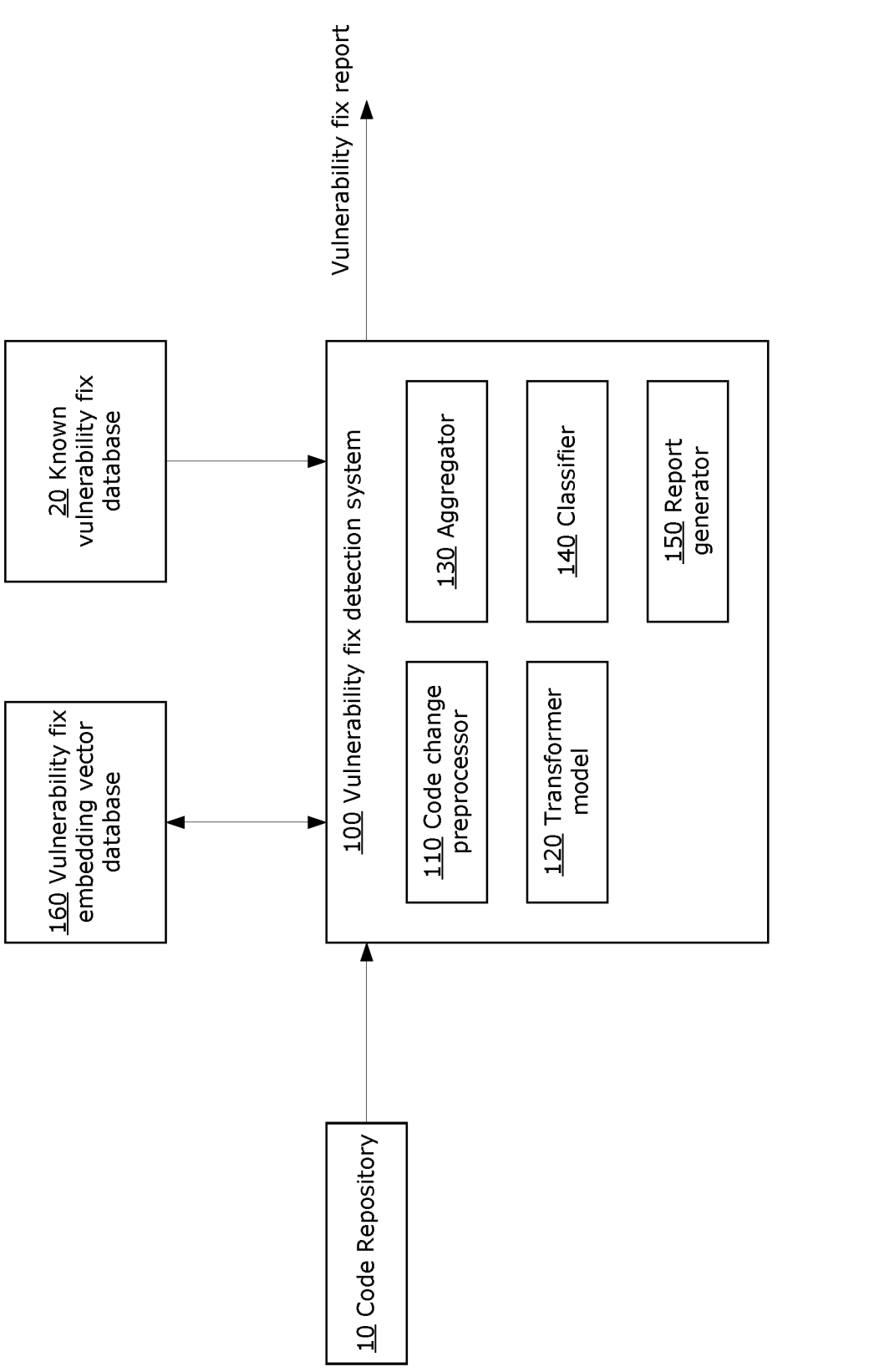
FIG. 1 is a block diagram illustrating an example vulnerability fix detection system, in accordance with examples of the present disclosure.

To assist in understanding the present disclosure, some terminology is first introduced. Open source software (OSS), which may also be referred to as open source component or open source library, refers to a file (e.g., a piece of software, routine, subroutine, etc.) that is publicly available for anyone to use. A file typically contains one or more lines of code. OSS is typically publicly accessible via a code repository.

In the context of a code repository, a commit refers to an update to a file in the repository. A commit typically includes a commit message, which may contain information about the purpose of the commit; an identification (e.g., file name) of the file being updated; and the code change being applied by the commit. A code change contained in the commit may be a line of code to be added to the file, or may be a line of code to be removed from the file, for example. The commit typically includes only the line(s) of code that is affected by the update (e.g., includes only the line(s) of code being removed from the file and/or the line(s) of code being added to the file). It should be noted that the line(s) of code contained in a commit typically is not usable as standalone code. A commit may also include artefacts (also referred to as artifacts). In software development, an artefact refers to information that is relevant to the development of the software, but is not the software itself. For example, software documentation is a type of artefact. In the case of a commit, commit relevant artefacts may include the commit message included in the commit itself, as well as any report that describes the vulnerability that is fixed by the commit.

Some background about vulnerability management in OSS is now provided. A commit that is developed to fix a given vulnerability in a particular file may be referred to as a vulnerability fix. Any software that is developed using that particular file may suffer from the given vulnerability. Applying the vulnerability fix to the affected software causes the code change in the commit to be applied. Applying a vulnerability fix may require a user of the particular file to first be aware of the availability of the vulnerability fix in a code repository. Response disclosure (also referred to as a coordinated vulnerability disclosure) is an existing approach to vulnerability disclosure, in which a vulnerability (or other issue to be fixed) is disclosed to the user (and possibly other members of the public) only after a period of time that allows for a vulnerability fix to be developed and published.

In the context of OSS vulnerability management, the response disclosure approach may start with the identification of a vulnerability in a file by a developer of that file (e.g., the OSS vendor). The identification of the vulnerability is kept secret (i.e., not disclosed to the public) until a vulnerability fix has been developed. The vulnerability fix is integrated into a new release of the file, and is submitted to the code repository. An advisory is issued by the developer to disclose the vulnerability and relevant vulnerability fix. A user of the affected file relies on the vulnerability advisory to be made aware of the vulnerability and the relevant vulnerability fix. The user then applies the vulnerability fix to their own affected software (i.e., the software developed using the affected file). A problem with the response disclosure approach is that the user must monitor vulnerability advisories (e.g., using the National Vulnerability Database (NVD)) to be aware of vulnerabilities and relevant vulnerability fixes. If a malicious party is monitoring vulnerability advisories more closely than a user or is able to identify a vulnerability fix in the code repository prior to disclosure in a vulnerability advisory, the malicious party may be aware of a vulnerability before the user, and may exploit the vulnerability before the user can apply the relevant vulnerability fix. This problem is exacerbated by the fact that not all vulnerability fixes are disclosed in advisories, meaning a user may not be aware of unreported vulnerabilities and relevant vulnerability fixes.

Another existing approach to vulnerability management is to identify a vulnerability fix using commit relevant artefacts that indicate a vulnerability. For example, the presence of vulnerability-related or security-related words in the commit message of a given commit may be used to identify the given commit as a vulnerability fix. However, a drawback of this approach is that not all vulnerabilities fixes have commit relevant artefacts that include vulnerability-related information. In particular, due to the principle in the response disclosure approach that vulnerabilities should be fixed secretly, it is common practice that commit messages do not include any security-related or vulnerability-related words.

In various examples, the present disclosure enables detection of a vulnerability fix in a code repository, without relying on security advisories or commit relevant artefacts. Instead, systems and methods described herein enable a commit in a code repository to be detected as a vulnerability fix by directly analyzing the code change contained in the commit.

FIG. 1 is a block diagram illustrating an example vulnerability fix detection system 100. The vulnerability fix detection system 100 may be implemented in a single physical machine or device (e.g., implemented as a single computing device, such as a single workstation, single server, etc.), or may be implemented using a plurality of physical machines or devices (e.g., implemented as a server cluster). For example, the vulnerability fix detection system 100 may be implemented as a virtual machine or a cloud-based service (e.g., implemented using a cloud computing platform providing a virtualized pool of computing resources).

The vulnerability fix detection system 100 is in communication (e.g., over a network) with a code repository 10, a known vulnerability fix database 20, a vulnerability fix embedding vector database 160, and optionally one or more user devices (not shown).

The code repository 10 stores files that may be accessible by users (e.g., publicly accessible in the case of an OSS repository) who may use any of the files to develop their own software. Updates to a file may be submitted to the code repository 10 in the form of commits. Although a single code repository 10 is shown in FIG. 1, it should be understood that the vulnerability fix detection system 100 may communicate with and detect vulnerability fixes in a plurality of code repositories 10.

The known vulnerability fix database 20 contains information about known vulnerabilities fixes (e.g., in the form of records storing information about respective vulnerability fixes). The information about each known vulnerability fix may include a unique identifier (ID) (e.g., a unique record ID) identifying the respective vulnerability fix, and information (e.g., in the form of a text string) describing the relevant vulnerability and/or the fix that is applied by the respective vulnerability fix. The known vulnerability fix database 20 may also include information about known vulnerabilities for which there are no relevant vulnerability fixes. Although a single known vulnerability fix database 20 is shown in FIG. 1, it should be understood that the vulnerability fix detection system 100 may communicate with and extract information from a plurality of known vulnerability fix database 20. Examples of a known vulnerability fix database 20 include the NVD and the Common Vulnerabilities and Exposures (CVE) system, among others. The information contained in the known vulnerability fix database 20 may be in any suitable format.

The vulnerability fix embedding vector database 160 contains embedding vectors that represent known vulnerability fixes. Each embedding vector stored in the vulnerability fix embedding vector database 160 represents the semantic meaning of the code change in a respective commit that is known (e.g., identified in the known vulnerability fix database 20) to be a vulnerability fix. Embedding vectors that are close to each other in the vector space may be considered to be similar embedding vectors, and represent code changes that are semantically similar. As will be discussed further below, the embedding vectors in the vulnerability fix embedding vector database 160 may be generated by the vulnerability fix detection system 100, for example during the training phase (i.e., during training of the vulnerability fix detection system 100, in particular training of a transformer model and a classifier as discussed below) and/or during the application phase (i.e., during execution of the trained vulnerability fix detection system 100). Each embedding vector in the vulnerability fix embedding vector database 160 is associated with a unique ID (which may be the same as the record ID used in the known vulnerability fix database 20), which may be used to reference the known vulnerability fix database 20.

The vulnerability fix detection system 100 in this example includes subsystems including a code change preprocessor 110, a transformer model 120, an aggregator 130, a classifier 140 and a report generator 150. Although FIG. 1 illustrates certain subsystems of the vulnerability fix detection system 100, it should be understood that this is not intended to be limiting, and the vulnerability fix detection system 100 may include greater or fewer number of subsystems (and may not include any subsystem at all). Functions described as being performed by a particular subsystem may be performed by a different subsystem, and/or may be a function of the overall vulnerability fix detection system 100. Operation of the vulnerability fix detection system 100 will be discussed in greater detail further below.

Figure 2:
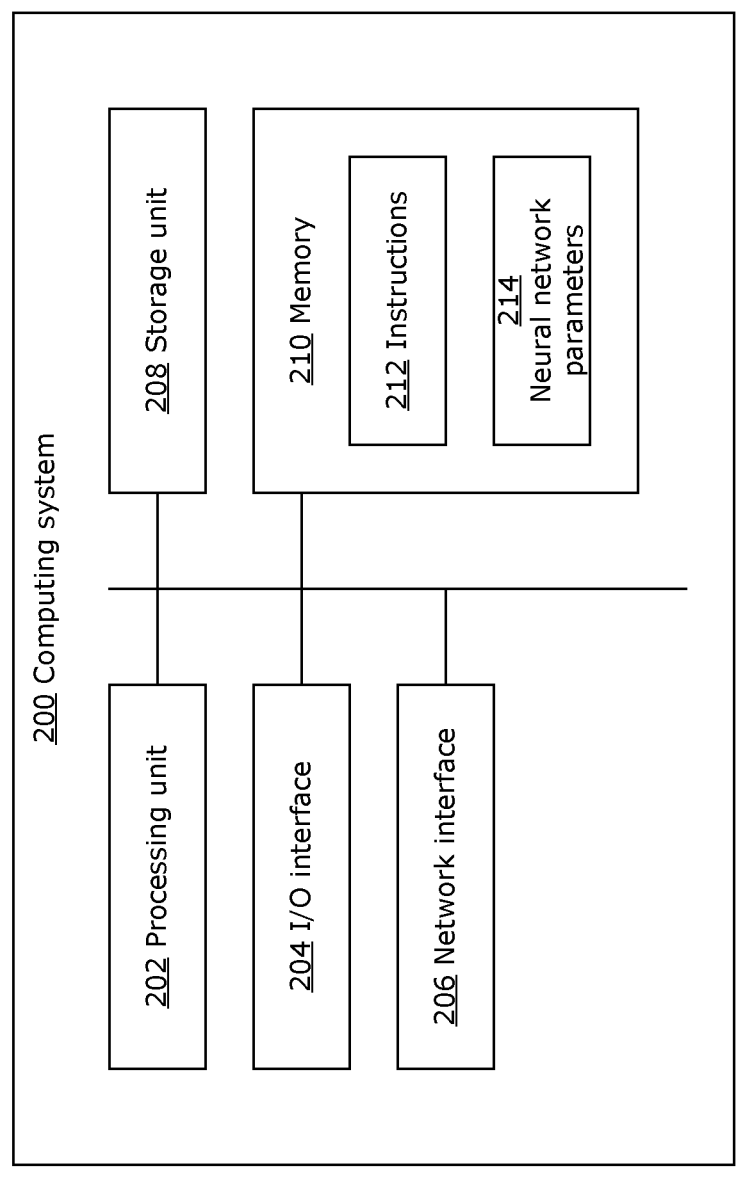
FIG. 2 is a block diagram illustrating an example computing system that may be used to implement a vulnerability fix detection system, in accordance with examples of the present disclosure.

FIG. 2 is a block diagram illustrating a simplified example computing system 200 that may be used for implementing the vulnerability fix detection system 100, in some embodiments. The computing system 200 may represent a server or a workstation, for example. As discussed previously, the vulnerability fix detection system 100 may be implemented in other hardware configurations, including implementation using a plurality of computing systems. Although FIG. 2 shows a single instance of each component, there may be multiple instances of each component in the computing system 200. The computing system 200 may be used to execute instructions for training a neural network and/or for executing a trained neural network, as discussed further below.

In this example, the computing system 200 includes at least one processing unit 202, such as a processor, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof.

The computing system 200 may include an input/output (I/O) interface 204, which may enable interfacing with an input device and/or output device (not shown).

The computing system 100 may include a network interface 206 for wired or wireless communication with other computing systems (e.g., the code repository 10, the known vulnerability fix database 20, the vulnerability fix embedding vector database 160, etc.). The network interface 206 may include wired links (e.g., Ethernet cable) and/or wireless links (e.g., one or more antennas) for intra-network and/or inter-network communications. The network interface 206 may also enable the computing system 200 to communicate generated reports to another computing system (e.g., to a user device).

The computing system 200 may include a storage unit 208, which may include a mass storage unit such as a solid state drive, a hard disk drive, a magnetic disk drive and/or an optical disk drive.

The computing system 200 may include a memory 210, which may include a volatile or non-volatile memory (e.g., a flash memory, a random access memory (RAM), and/or a read-only memory (ROM)). The non-transitory memory 210 may store instructions for execution by the processing unit 202, such as to carry out example embodiments described in the present disclosure. For example, the memory 210 may store instructions 212 for implementing the vulnerability fix detection system 100 as well as any of the methods disclosed herein. The memory 210 may also store neural network parameters 214, which may be parameters learned from training a neural network, as described further below. The memory 210 may include other software instructions, such as for implementing an operating system and other applications/functions.

The computing system 200 may additionally or alternatively execute instructions from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

Reference is again made to FIG. 1. Some subsystems of the vulnerability fix detection system 100 can be implemented using neural networks, which are trained using machine learning techniques. For example, the transformer model 120 may be implemented using a neural network, and the classifier 140 may be implemented using another neural network. Prior to application of the vulnerability fix detection system 100 (i.e., prior to use of the vulnerability fix detection system 100 to detect vulnerability fixes in a code repository 10), the vulnerability fix detection system 100 may be trained using machine learning techniques.

The training of the vulnerability fix detection system 100 may be considered to take place in two phases, in which the transformer model 120 is trained first, then the classifier 140 is trained second. The training of the vulnerability fix detection system 100 may be performed by the same computing system (e.g., the computing system 200) on which the trained vulnerability fix detection system 100 is executed in the application phase. Alternatively, training and application of the vulnerability fix detection system 100 may be performed by different computing systems.

FIG. 3 is a flowchart illustrating an example method 300 for training the transformer model 120. The method 300 may be performed by any computing system (e.g., the computing system 200) that is configured for performing computations required for training a neural network. Training of the transformer model 120 may involve fine-tuning (i.e., training) a pre-trained language model (e.g., a neural network that has been previously trained to generate semantic representations of human language) to generate embedding vectors (i.e., vector representations in a latent vector space) representing file-level code change in a commit. File-level code change refers to all code changes in a given commit that affects a given file (since a given commit may include code changes for one or more files).

At 302, a commit is received, which is associated with a ground-truth label. The received commit may be any commit for which a ground-truth label is available, to indicate whether the commit is a vulnerability fix or not. For example, information from the known vulnerability fix database 20 may be used create a training dataset that contains both commits that are known to be vulnerability fixes and commits that are known to not be vulnerability fixes. Then commits in the training dataset may be sampled at 302.

At 304, preprocessing is performed (e.g., using the code change preprocessor 110) to generate, from the commit, a file-level token sequence representing file-level code change(s). If there are multiple files affected by the commit, respective multiple file-level token sequences may be generated.

Preprocessing may involve first extracting the file-level code change(s) from the commit. For example, the code change preprocessor 110 may parse the commit to identify (e.g., based on known code syntax) and extract line(s) of code relating to code change(s). The extracted line(s) of code may be separated by affected file (e.g., grouped into separate code change documents, where each code change document contains all code change(s) in the commit that affect a single file). Further, the file-level code change(s) for a given file may be grouped (e.g., concatenated) into file-level added code line(s) (also referred to as added code segment) and file-level removed code line(s) (also referred to as removed code segment).

Tokenization (e.g., similar to tokenization typically performed in natural language processing (NLP) algorithms, but adapted to include symbols used in coding) is then performed on the added code segment and the removed code segment to generate a sequence of added code tokens and removed code tokens, respectively, for each file affected by the commit. To account for the syntax typically used in coding, tokenization may split a single camel case style token (i.e., a single token generated from a single camel case word, such as "addData") into separate tokens (e.g., "add-Data" may be split into two tokens "add" and "Data"), and similarly a single snake case style token (i.e., a single token generated from a single snake case word, such as "add_data") may also be split into separate tokens (e.g., "add_data" may be split into two tokens "add" and "data"). It should be understood that other tokenization techniques may be used to tokenize the code segments, in accordance with the known code syntax of the commit.

Information describing the code change may be extracted. For example, code comments and the commit message contained in the commit may be extracted. In some commits, the commit message may include a link (or other reference) to an available issue report. The issue report may be accessed using the link (or other reference) and the description contained in the issue report may also be extracted. The extracted code comments and commit message (and optionally issue report description) may be merged (e.g., concatenated) together as the description of the code change. It may be noted that the description may be a general description for the commit, and may not be specific to each affected file (i.e., the description may not be a file-level description). The description is then tokenized into a sequence of description tokens.

The sequence of description tokens, sequence of added code tokens and sequence of removed code tokens relevant to a single file are then combined to generate the file-level token sequence for that file. If there is a plurality of files affected by the commit, a respective plurality of file-level token sequences are generated.

Figure 4:
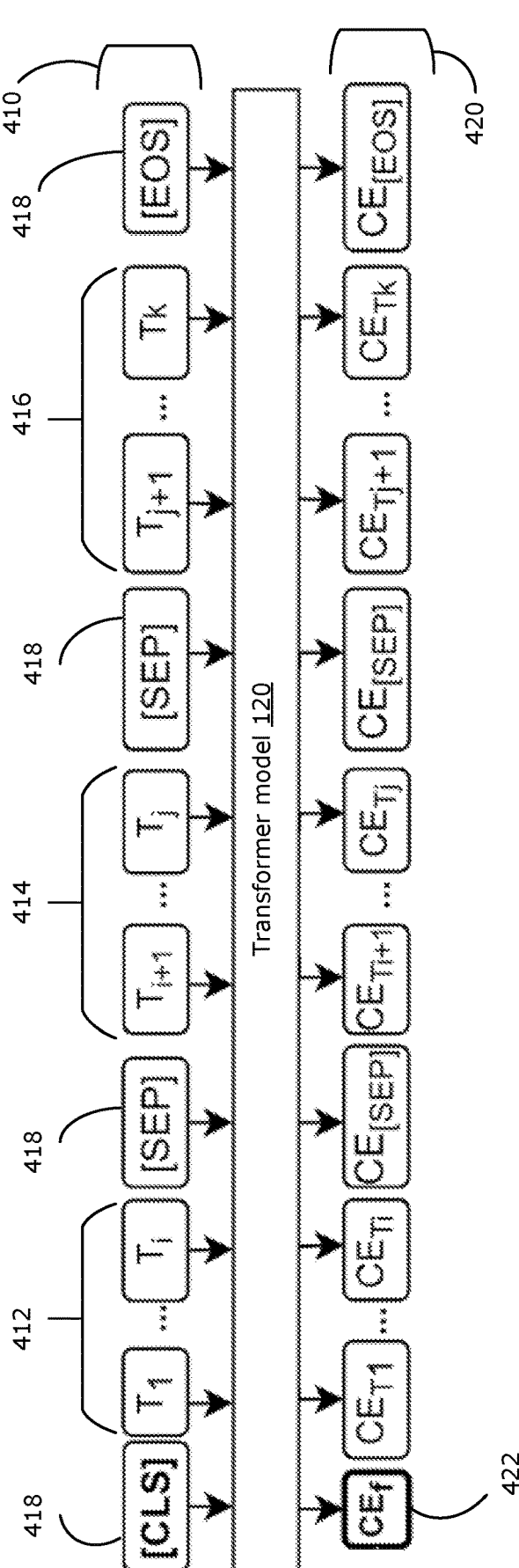
FIG. 4 is a simplified diagram illustrating an example of how a file-level token sequence is processed by a transformer model into embedding vectors, in accordance with examples of the present disclosure.

In an example, special tokens (e.g., the classification token [CLS], the separator token [SEP], and the end of sentence token [EOS]) are added to separate each of the sequence of description tokens, sequence of added code tokens and sequence of removed code tokens, as shown in FIG. 4 (discussed further below). For example, the [CLS]

token may be appended to the front of the file-level token sequence; the [SEP] token may be inserted between the sequence of description tokens and the sequence of added code tokens, and between the sequence of added code tokens and the sequence of removed code tokens; and the [EOS] token may be appended to the end of the file-level token sequence. It should be understood that this is exemplary, and other ways of combining (e.g., other ways of concatenating) the sequence of description tokens, sequence of added code tokens and sequence of removed code tokens may be possible. The resulting file-level token sequence may include at least one key token (e.g., a token that is not the result of tokenization of the commit, such as an appended [CLS] token) which may be encoded into an embedding vector that represents the semantic meaning of the file-level token sequence as a whole, as discussed further below.

At 306, each file-level token sequence is inputted into the transformer model 120, to generate a respective file-level code change embedding vector (also referred to as a file-level contextual embedding or file-level contextual embedding vector). In some examples, a transformer tokenizer may be used to preprocess the file-level token sequence into an input embedding vector, which is inputted to the transformer model 120.

The transformer model 120 may be a pre-trained neural network model, for example a pre-trained language model (e.g., Bidirectional Encoder Representations from Transformers (BERT)). A pre-trained language model is already trained on a human language corpus to encode tokenized sentences into embedding vectors that represent the semantic meaning of sentences. However, because the syntax and semantic meaning of software code is not equivalent to human language, the pre-trained language model should be further trained (or fine-tuned) to correctly encode tokenized code segments into embedding vectors that represent the semantic meaning of the code segments. Further, it should be appreciated that the transformer model 120 in the present disclosure is trained to generate embedding vectors that represent the semantic meaning of the file-level code change in the commit, which is a different task than generating embedding vectors that represent the semantic meaning of a software function.

The transformer model 120 encodes the inputted file-level token sequence, and generates a sequence of embedding vectors (e.g., an embedding vector is generated for each token in the file-level token sequence). In particular, the key token (e.g., the [CLS] token) in the file-level token sequence is encoded into an embedding vector that represents the overall semantic meaning of the file-level code change represented by the file-level token sequence. Accordingly, the embedding vector that is generated from the key token may be referred to as the file-level code change embedding vector. The file-level code change embedding vector represents the semantic relevance between any removed line(s) of code and any added line(s) of code in the file-level code change of the commit. An example of this is illustrated in FIG. 4.

In the example of FIG. 4, the input to the transformer model 120 is the file-level token sequence 410, which includes a sequence of description tokens 412, a sequence of added code tokens 414, and a sequence of removed code tokens 416, separated by special tokens 418 (including the key token [CLS]). It should be understood that the tokens in the file-level token sequence 410 may be arranged in a different order than that shown in this example. The transformer model 120 processes (e.g., forward propagates) the file-level token sequence 410 and outputs a sequence of embedding vectors 420 (also referred to as contextual embeddings (CE)). In this example, the embedding vectors denoted $CE_{T1} \ldots CE_{Ti}$ correspond to each token (denoted $T_1 \ldots T_i$) of the sequence of description tokens 412; the embedding vectors denoted $CE_{Ti+1} \ldots CE_{Tn}$ correspond to each token (denoted $T_{i+1} \ldots T_j$) of the sequence of added code tokens 414; the embedding vectors denoted $CE_{Tj+1} \ldots CE_{Tk}$ correspond to each token (denoted $T_{j+1} \ldots T_k$) of the sequence of removed code tokens 416; and the embedding vectors denoted $CE_f$, $CE_{[SEP]}$ and $CE_{[EOS]}$ correspond to each respective special token 418 (i.e., the [CLS], [SEP] and [EOS] tokens). In particular, the embedding vector CE f that encodes the key token [CLS] is considered to represent the overall semantic meaning of the file-level code change (which is represented by the file-level token sequence 410). The vector representation $CE_f$ is thus referred to herein as the file-level code change embedding vector 422.

Reference is again made to FIG. 3. At 308, the file-level code change embedding vector is inputted to at least one neural network layer, which generates a predicted vulnerability fix score. If there is a plurality of file-level code change embedding vectors (corresponding to a plurality of files affected by the commit), a respective predicted vulnerability fix score is generated for each file-level code change embedding vector.

In an example, the file-level code change embedding vector is inputted to a fully connected layer, followed by an output layer (e.g., a softmax layer). The output from the output layer is a score that represents the probability that the file-level code change represented by the file-level code change embedding vector is for fixing a vulnerability in the relevant file.

At 310, a cross-entropy loss is computed, using the predicted vulnerability fix score and the ground-truth label associated with the commit. A backpropagation algorithm is then used to update the parameters (e.g., weights) of the transformer model 120, based on the gradient of the computed loss (i.e., to minimize the computed loss). If a plurality of vulnerability fix scores have been predicted for a respective plurality of file-level code changes in the commit, the cross-entropy loss may be computed for each predicted vulnerability fix score, or an aggregated cross-entropy loss may be computed using an aggregate (e.g., average) predicted vulnerability fix score.

Steps 302-310 may be iterated (with new commits sampled from the training dataset each iteration) until a convergence condition is satisfied. For example, a convergence condition may be that the cross-entropy loss converges, the parameters of the transformer model 120 converge and/or a maximum number of iterations has been reached.

After the convergence condition is satisfied, the method 300 proceeds to 312. At 312, the learned parameters of the transformer model 120 are stored (e.g., stored as neural network parameters 214 in the memory 210 of the computing system 200). In some examples, if the computing system that performs training is different from the computing system that executes the trained transformer model 120, the learned parameters may be communicated (e.g., over a network) to the computing system that executes the trained transformer model 120.

After the transformer model 120 has been sufficiently trained (e.g., using the method 300), the learned parameters of the transformer model 120 are fixed. The classifier 140 is then trained.

FIG. 5 is a flowchart illustrating an example method 500 for training the classifier 140. The method 500 may be performed by any computing system (e.g., the computing system 200) that is configured for performing computations required for training a neural network. The classifier 140 is trained to predict whether a given commit is for fixing vulnerabilities or not.

Steps 502-506 are similar to steps 302-306 described previously, and a detailed discussion need not be repeated here.

At 508, all the file-level code change embedding vector(s) for a given commit (i.e., for a given commit received at step 502) are combined into a single commit-level code change embedding vector. For example, step 508 may be performed using the aggregator 130.

Various techniques may be used to combine the file-level code change embedding vector(s). For example, a code change embedding matrix may be defined in which each file-level code change embedding vector forms a respective row of the code change embedding matrix (note that all file-level code change embedding vector(s) generated by the transformer model 120 have the same vector length). Then, the commit-level code change embedding vector may be generated by taking the average of each column of the code change embedding matrix (thus, the commit-level code change embedding vector is the result of averaging the file-level code change embedding vector(s)); or by taking the maximum value in each column of the code change embedding matrix (thus, each vector element of the commit-level code change embedding vector is the maximum value of the corresponding vector element across all of the file-level code change embedding vector(s)). Other aggregation techniques may be used to generate the commit-level code change embedding vector. Further, the commit-level code change embedding vector may or may not have the same vector length as the file-level code change embedding vector(s). For example, the commit-level code change embedding vector may be generated by concatenating the average column values of the file-level code change embedding vector(s) with the maximum column values of the file-level code change embedding vector(s).

If the commit is known to be a vulnerability fix (e.g., the ground-truth label associated with the commit, received at step 502, indicates a vulnerability fix), the commit-level code change embedding vector generated at step 508 may also be stored in the vulnerability fix embedding vector database 160.

At 510, the commit-level code change embedding vector is inputted to the classifier 140, to generate a predicted commit-level vulnerability fix score. The classifier 140 may have any neural network architecture that is suitable for performing a classification task (e.g., a fully connected neural network (FCNN)). The predicted commit-level vulnerability fix score may be a numerical value (e.g., from 0.00 to 1.00) that represents the probability that the commit (received at step 502) includes code change that fixes a vulnerability for at least one affected file; the higher the score, the greater the probability that the commit is a vulnerability fix.

At 512, a cross-entropy loss is computed, using the predicted commit-level vulnerability fix score and the ground-truth label associated with the commit. A backpropagation algorithm is then used to update the parameters (e.g., weights) of the classifier 140, based on the gradient of the computed loss (i.e., to minimize the computed loss).

Steps 502-512 may be iterated (with new commits sampled from the training dataset each iteration) until a convergence condition is satisfied. For example, a convergence condition may be that the cross-entropy loss converges, the parameters of the classifier 140 converge and/or a maximum number of iterations has been reached.

After the convergence condition is satisfied, the method 500 proceeds to 514. At 514, the learned parameters of the classifier 140 are stored (e.g., stored as neural network parameters 214 in the memory 210 of the computing system 200). In some examples, if the computing system that performs training is different from the computing system that executes the trained classifier 140, the learned parameters may be communicated (e.g., over a network) to the computing system that executes the trained classifier 140.

After both the transformer model 120 and the classifier 140 have been sufficiently trained (e.g., using the methods 300 and 500, respectively), the learned parameters of the transformer model 120 and classifier 140 are fixed. The vulnerability fix detection system 100 is now considered to be sufficiently trained and can be used in the application phase, to detect vulnerability fixes present in the code repository 10.

Figure 6:
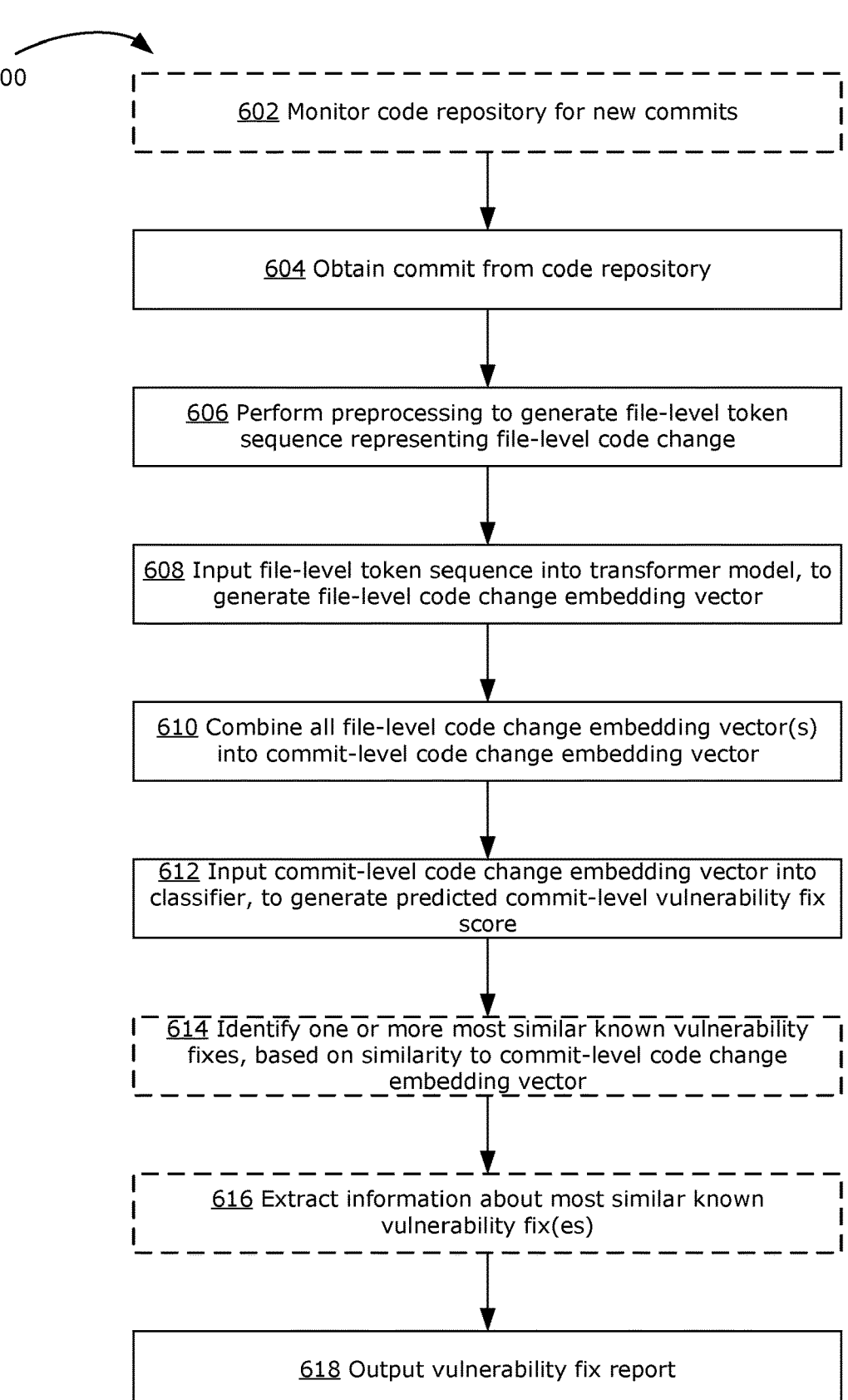
FIG. 6 is a flowchart illustrating an example method for detecting and reporting a vulnerability fix, in accordance with examples of the present disclosure.

FIG. 6 is a flowchart illustrating an example method 600 for detecting and reporting whether a commit in the code repository 10 is a vulnerability fix. The method 600 may be performed by any computing system (e.g., the computing system 200) that is configured for performing computations required for executing a neural network (e.g., for executing the transformer model 120 and the classifier 140 in the vulnerability fix detection system 100).

Optionally, at 602, the code repository 10 may be monitored for any new commits added to the code repository 10. For example, the vulnerability fix detection system 100 may be integrated into an automatic monitoring service (e.g., a cloud-based service) to monitor every new commit added to an OSS repository. Various techniques may be used to monitor the code repository 10 for a new commit, and need not be discussed in detail. One or more code repositories 10 may be monitored; however for simplicity the following discussion will refer to a single code repository 10.

In some examples, step 602 may not be performed. For example, the vulnerability fix detection system 100 may not be part of an automatic monitoring service, but may be called by the automatic monitoring service when a new commit is detected in the code repository 10. In another example, a user may identify a new commit in the code repository 10 and use the vulnerability fix detection system 100 to determine whether the new commit is a vulnerability fix.

At 604, a commit is obtained from the code repository 10. For example, the new commit that has been found from the monitoring at step 602 may be obtained (e.g., downloaded) from the code repository 10. In another example, a new commit that a user has downloaded from the code repository 10 may be provided (e.g., uploaded) to the vulnerability fix detection system 100. Unlike the commits used for training (e.g., in the methods 300 and 500), the commit obtained at step 604 lacks any label indicating whether the commit is a vulnerability fix or not.

In some examples, a plurality of commits (or a set of commits) is obtained from the code repository 10 at step 604. For example, if monitoring of the code repository 10 is performed at regular intervals (e.g., at a predefined time each day), then all new commits that are found at each interval may be obtained as a set of new commits. For simplicity, the following discussion describes operations for processing a single commit, however it should be understood that this can be generalized to processing a set of commits.

At 606, preprocessing is performed (e.g., using the code change preprocessor 110) to generate, from the commit, a file-level token sequence representing file-level code change(s). If there are multiple files affected by the commit, respective multiple file-level token sequences may be generated. For example, each file-level token sequence may include a sequence of description tokens, a sequence of added code tokens, and a sequence of removed code tokens, which are tokenized from the commit. In particular, each file-level token sequence that is generated by the preprocessing includes a key token (e.g., [CLS] token appended to the front of each file-level token sequence). This preprocessing may be performed using operations similar to those described above with respect to step 304, the details of which need not be repeated here.

At 608, each file-level token sequence is inputted into the transformer model 120 (e.g., executed using the learned parameters from the method 300), to generate a respective file-level code change embedding vector. In some examples, a transformer tokenizer may be used to preprocess the file-level token sequence into an input embedding vector, which is inputted to the transformer model 120. If the commit affects a plurality of files, a respective plurality of file-level code change embedding vectors are generated. Each file-level code change embedding vector is a vector representation of the respective file-level code change in the commit, and encodes the semantic meaning of the code change affected the relevant file.

In particular, the key token (e.g., the [CLS] token) in the file-level token sequence is encoded by the transformer model 120 into the file-level code change embedding vector that represents the overall semantic meaning of the file-level code change represented by the file-level token sequence.

At 610, all the file-level code change embedding vector(s) for each given commit obtained at step 604 are combined into a single commit-level code change embedding vector. For example, step 610 may be performed using the aggregator 130, using any suitable combination technique (e.g., as discussed above with respect to step 508). The commit-level code change embedding vector is a vector representation of all the code changes (i.e., all code changes to all affected files) contained in the commit. The commit-level code change embedding vector encodes the semantic meaning of the code changes in the commit.

At 612, the commit-level code change embedding vector is inputted into the classifier 140 (e.g., executed using the learned parameters from the method 500), to generate a predicted commit-level vulnerability fix score for each given commit obtained at step 604. The predicted commit-level vulnerability fix score may be a numerical value (e.g., from 0.00 to 1.00) that represents the probability that the commit includes code change that fixes a vulnerability for at least one affected file; the higher the score, the greater the probability that the commit is a vulnerability fix.

Optionally, steps 614-616 may be performed to extract vulnerability fix information, which may be included in the vulnerability fix report. In some examples, steps 614-616 may be performed only for a commit having a predicted vulnerability fix score that exceeds a predefined threshold (e.g., having a score higher than 0.50 or higher than 0.75). If steps 614-616 are omitted, the vulnerability fix report may only provide the predicted vulnerability fix score.

At 614, one or more known vulnerability fixes that are most similar to each given commit are identified. In particular, the one or more known vulnerability fixes that are most similar to a given commit are identified based on similarity between the commit-level code change embedding vector for the given commit and the embedding vectors stored in the vulnerability fix embedding vector database 160.

The embedding vectors stored in the vulnerability fix embedding vector database 160 commit-level code change embedding vectors that are generated from known vulnerability fixes (e.g., vulnerability fixes that are identified in the known vulnerability fix database 20). For example, commits in the known vulnerability fix database 20 may be processed by the vulnerability fix detection system 100 to generate respective commit-level code change embedding vectors, which are then stored in the vulnerability fix embedding vector database 160. In some examples, the embedding vectors stored in the vulnerability fix embedding vector database 160 may be generated as part of training the classifier 140 (e.g., at step 508 described above).

Similarity between the commit-level code change embedding vector for the given commit and an embedding vector in the vulnerability fix embedding vector database 160 may be computed using any suitable technique, for example based on distance between the vectors (e.g., Euclidean distance) or based on correlation between the vectors (e.g., dot product), among other possibilities.

If an embedding vector in the vulnerability fix embedding vector database 160 is identified to be similar to the commit-level code change embedding vector, this means that the identified embedding vector represents a commit having code change that is semantically similar to the code change represented by the commit-level code change embedding vector for the given commit. The top N (where N is a preselected non-zero positive integer) most similar embedding vectors in the vulnerability fix embedding vector database 160 may be identified. Each identified most similar embedding vector is associated with a respective unique ID, which may be used to reference the known vulnerability fix database 20 in order to identify the corresponding known vulnerability fixes. In this way, one or more (e.g., the top N) most similar known vulnerability fixes can be identified, for each given commit.

At 616, information about the identified one or more most similar known vulnerability fixes is extracted from the known vulnerability fix database 20. As previously mentioned, each identified most similar embedding vector is associated with a respective unique ID. These unique IDs may be used to reference the known vulnerability fix database 20, to extract the corresponding vulnerability fix information (e.g., a text description of the vulnerability being fixed and the manner of the fix). If more than one most similar known vulnerability fix has been identified for a given commit, the extracted vulnerability fix information may be extracted from corresponding more than one known vulnerability fix records.

At 618, a vulnerability fix report is generated (e.g., using the report generator 150) and outputted by the vulnerability fix detection system 100. For example, the vulnerability fix report may be outputted to a user device associated with an OSS user. The vulnerability fix report may, in some examples, be outputted to a report repository (e.g., a repository of vulnerability disclosure advisories) and may be considered equivalent to vulnerability advisories that are conventionally issued by an OSS vendor.

The vulnerability fix report may be formatted as a table, where each row in the table corresponds to a given commit. If a plurality of commits was processed by the vulnerability fix detection system 100 (e.g., a set of new commits was obtained at step 604), each commit may be a respective row in the table. For each commit, the vulnerability fix report may include a unique ID identifying the commit in the code repository 10, and the predicted vulnerability fix score for that commit. If a plurality of commits (e.g., a set of new commits) was obtained at step 604, the commits may be ranked in the report in order of predicted vulnerability fix score. In another example, any commit having a predicted vulnerability fix score above a predefined threshold (e.g., above a score of 0.50, above a score of 0.75, or higher) may be indicated (e.g., using a binary flag or label) in the report as a possible vulnerability fix. Other methods for indicating detection of a likely vulnerability fix may be used.

If information about similar known vulnerability fix(es) was extracted (e.g., using steps 614-616), the vulnerability fix information may also be included in the report (e.g., if the report is in a table format, the table may include a column containing the vulnerability fix information for the commit in each respective row).

Including vulnerability fix information in the report may help a user to understand the vulnerability being fixed by a given commit and/or the manner in which the vulnerability is fixed. The vulnerability fix information may enable a user to decide whether or not to apply the given commit to the user's affected software.

In some examples, if a high commit-level vulnerability fix score has been predicted at step 612 for a given commit, the commit-level code change embedding vector for that given commit may also be added to the vulnerability fix embedding vector database 160.

The method 600 may be performed continuously and/or periodically, to automatically monitor the code repository 10 for new vulnerability fixes, for example. In some examples, the monitoring may be performed in real-time or near real-time, such that a new commit that is submitted to the code repository 10 can be detected as a vulnerability fix and reported as soon as the new commit is submitted.

The vulnerability fix detection system 100 may thus enable vulnerability fixes in the code repository 10 to be detected and reported in a timely manner, without relying on disclosure advisories or commit-relevant artefacts (e.g., commit messages or issue reports). In particular, vulnerability fixes that are not disclosed may be detected and reported to a user, to enable a user to act promptly to fix a vulnerability in an affected software.

In some examples, the code change preprocessor 110 may, instead of parsing code in a commit into file-level token sequences, parse the code into file-level abstract syntax trees (AST). An AST is a tree data structure for representing code structure. For example, "if-else" code that is conditional on a given condition may be parsed into an AST where the condition is a node from which the "if" code is one branch and the "else" code is another branch. The file-level AST may be used as input to the transformer model 120 instead of the file-level token sequence, with training of the transformer model 120 taking place as described above. In order to properly parse the code in a commit into file-level AST, it may be necessary for the code change preprocessor 110 to access and extract portions of the source code before and/or following the line(s) of code affected by a code change.

The vulnerability fix detection system 100 may be readily adaptable for other software engineering tasks related to code change, and is not necessarily limited to detection of vulnerability fixes. For example, any type of code change (e.g., code refactoring, software revision, etc.) may be provided as input to the vulnerability fix detection system 100, instead of a commit. The vulnerability fix detection system 100 may be trained to detect whether a code change is a bug fix, a performance improvement code change, a code refactoring activity, etc. It should be understood by one skilled in the art that the transformer model 120 and classifier 140 may be trained to suit the desired code change detection task, without departing from the scope of the present disclosure.

In general, the present disclosure provides systems and methods that enable the semantic meaning of a code change to be understood (e.g., represented as a code change embedding vector) and used to classify the purpose of the code change (e.g., predict whether the code change is a vulnerability fix, a bug fix, etc.).

It should be noted that although some examples of the present disclosure are described in the context of OSS, the present disclosure may be applicable outside the context of OSS. For example, for closed source software the code change may not be explicitly indicated as added or removed lines of code in a commit, however a straightforward comparison may be made to identify the code difference (e.g., removed code and/or added code) in the binary code between a new release version and the previous release version. This code difference may be used as input to the vulnerability fix detection system in place of a commit, for example in order to detect whether the new release version contains a security update (i.e., a vulnerability fix). This information may enable a user to better decide whether to upgrade to the new release version or not (since sometimes a security update may not be disclosed).

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
obtaining a commit from a code repository;
preprocessing the commit to generate one or more file-level token sequences each representing at least one file-level code change for respective one or more files;
generating respective one or more file-level code change embedding vectors by inputting each of the one or more file-level token sequences into a transformer model, each respective file-level code change embedding vector being a vector representation of the at least one file-level code change for the respective file;
wherein the transformer model is fine-tuned from a pre-trained language model that has been pre-trained to generate embedding vectors representing human language, wherein the fine-tuning includes training the pre-trained language model using training samples from a training dataset comprising training commits associated with ground-truth labels indicating whether each training commit is a vulnerability fix;
combining the one or more file-level code change embedding vectors into a commit-level code change embedding vector that is a vector representation of all code changes contained in the commit;
generating a predicted commit-level vulnerability fix score by inputting the commit level code change embedding vector into a classifier;
wherein the classifier is trained using the training dataset and the fine-tuned transformer model; and
outputting a vulnerability fix report containing an identification of the commit and the predicted commit-level vulnerability fix score associated with the commit.

2. The method of claim 1, further comprising:
identifying, from an embedding vector database, one or more embedding vectors that are most similar to the commit-level code change embedding vector, the one or more identified embedding vectors being associated with respective one or more unique identifiers;
identifying, from a known vulnerability fix database, one or more known vulnerability fixes corresponding to the respective one or more unique identifiers; and
extracting vulnerability fix information for each of the identified one or more known vulnerability fixes from the known vulnerability fix database;
wherein the extracted vulnerability fix information is associated with the commit and included in the vulnerability fix report.

3. The method of claim 1, wherein:
each of the one or more file-level token sequences includes a key token; and
the transformer model processes each given file-level token sequence by encoding each token in the given file-level token sequence into a respective embedding vector, the embedding vector encoded from the key token being the file-level code change embedding vector for the given file-level token sequence.

4. The method of claim 3, wherein preprocessing the commit comprises:
parsing the commit to extract any lines of added code for a given file, and tokenizing any lines of added code into a sequence of added code tokens;
parsing the commit to extract any lines of removed code for the given file, and tokenizing any lines of removed code into a sequence of removed code tokens;

parsing the commit to extract any code description, and tokenizing any code description into a sequence of description tokens; and
concatenating the sequence of description tokens, the sequence of added code tokens and the sequence of removed code tokens, and appending the key token, to generate the file-level token sequence representing code change for the given file.

5. The method of claim 1, further comprising:
monitoring the code repository to detect any commit that is new to the code repository; and
obtaining the commit from the code repository in response to detection that the commit is new.

6. The method of claim 1, further comprising, prior to obtaining the commit from the code repository:
fine-tuning the transformer model from the pre-trained language model to generate file-level code change embedding vectors using the training dataset; and
after fine-tuning of the transformer model, training the classifier to generate commit-level vulnerability fix scores, including:
using the fine-tuned transformer model to generate training file-level code change embedding vectors from a training sample sampled from the training dataset;
combining the training file-level code change embedding vectors into a training commit-level code change embedding vector;
inputting the training commit level code change embedding vector into the classifier to obtain a training commit-level vulnerability fix score; and
updating the classifier based on a loss computed using the training commit-level vulnerability fix score and the ground-truth label associated with the training sample.

7. The method of claim 1, wherein combining the one or more file-level code change embedding vectors into the commit-level code change embedding vector comprises averaging the one or more file-level code change embedding vectors.

8. The method of claim 1, wherein combining the one or more file-level code change embedding vectors into the commit-level code change embedding vector comprises, for each vector element of the commit-level code change embedding vector, taking a maximum value of a corresponding vector element across all of the one or more file-level code change embedding vectors.

9. A system comprising:
a processing unit configured to execute instructions to cause the system to:
obtain a commit from a code repository;
preprocess the commit to generate one or more file-level token sequences each representing at least one file-level code change for respective one or more files;
generate respective one or more file-level code change embedding vectors by inputting each of the one or more file-level token sequences into a transformer model, each respective file-level code change embedding vector being a vector representation of the at least one file-level code change for the respective file;
wherein the transformer model is fine-tuned from a pre-trained language model that has been pre-trained to generate embedding vectors representing human language, wherein the fine-tuning includes training the pre-trained language model using training samples from a training dataset comprising training commits associated with ground-truth labels indicating whether each training commit is a vulnerability fix;

combine the one or more file-level code change embedding vectors into a commit-level code change embedding vector that is a vector representation of all code changes contained in the commit;

generate a predicted commit-level vulnerability fix score by inputting the commit level code change embedding vector into a classifier;

wherein the classifier is trained using the training dataset and the fine-tuned transformer model; and output a vulnerability fix report containing an identification of the commit and the predicted commit-level vulnerability fix score associated with the commit.

10. The system of claim 9, wherein the processing unit is further configured to execute instructions to cause the system to:

identify, from an embedding vector database, one or more embedding vectors that are most similar to the commit-level code change embedding vector, the one or more identified embedding vectors being associated with respective one or more unique identifiers;

identify, from a known vulnerability fix database, one or more known vulnerability fixes corresponding to the respective one or more unique identifiers; and extract vulnerability fix information for each of the identified one or more known vulnerability fixes from the known vulnerability fix database;

wherein the extracted vulnerability fix information is associated with the commit and included in the vulnerability fix report.

11. The system of claim 9, wherein:

each of the one or more file-level token sequences includes a key token; and the transformer model processes each given file-level token sequence by encoding each token in the given file-level token sequence into a respective embedding vector, the embedding vector encoded from the key token being the file-level code change embedding vector for the given file-level token sequence.

12. The system of claim 11, wherein the processing unit is further configured to execute instructions to cause the system to preprocess the commit by:

parsing the commit to extract any lines of added code for a given file, and tokenizing any lines of added code into a sequence of added code tokens;

parsing the commit to extract any lines of removed code for the given file, and tokenizing any lines of removed code into a sequence of removed code tokens;

parsing the commit to extract any code description, and tokenizing any code description into a sequence of description tokens; and concatenating the sequence of description tokens, the sequence of added code tokens and the sequence of removed code tokens, and appending the key token, to generate the file-level token sequence representing code change for the given file.

13. The system of claim 9, wherein the processing unit is further configured to execute instructions to cause the system to:

monitor the code repository to detect any commit that is new to the code repository; and obtain the commit from the code repository in response to detection that the commit is new.

14. The system of claim 13, wherein the system is part of a monitoring system for monitoring the code repository.

15. The system of claim 9, wherein the processing unit is further configured to execute instructions to cause the system to, prior to obtaining the commit from the code repository:

fine-tune the transformer model from the pre-trained language model to generate file-level code change embedding vectors using the training dataset; and after fine-tuning the transformer model, train the classifier to generate commit-level vulnerability fix scores, including:

using the fine-tuned transformer model to generate training file-level code change embedding vectors from a training sample sampled from the training dataset;

combining the training file-level code change embedding vectors into a training commit-level code change embedding vector;

inputting the training commit level code change embedding vector into the classifier to obtain a training commit-level vulnerability fix score; and updating the classifier based on a loss computed using the training commit-level vulnerability fix score and the ground-truth label associated with the training sample.

16. The system of claim 9, wherein combining the one or more file-level code change embedding vectors into the commit-level code change embedding vector comprises averaging the one or more file-level code change embedding vectors.

17. The system of claim 9, wherein combining the one or more file-level code change embedding vectors into the commit-level code change embedding vector comprises, for each vector element of the commit-level code change embedding vector, taking a maximum value of a corresponding vector element across all of the one or more file-level code change embedding vectors.

18. A computer readable medium having instructions encoded thereon, wherein the instructions, when executed by a processing unit of a system, cause the system to:

obtain a commit from a code repository;

preprocess the commit to generate one or more file-level token sequences each representing at least one file-level code change for respective one or more files;

generate respective one or more file-level code change embedding vectors by inputting each of the one or more file-level token sequences into a transformer model, each respective file-level code change embedding vector being a vector representation of the at least one file-level code change for the respective file;

wherein the transformer model is fine-tuned from a pre-trained language model that has been pre-trained to generate embedding vectors representing human language, wherein the fine-tuning includes training the pre-trained language model using training samples from a training dataset comprising training commits associated with ground-truth labels indicating whether each training commit is a vulnerability fix;

combine the one or more file-level code change embedding vectors into a commit-level code change embedding vector that is a vector representation of all code changes contained in the commit;

generate a predicted commit-level vulnerability fix score by inputting the commit level code change embedding vector into a classifier;

wherein the classifier is trained using the training dataset and the fine-tuned transformer model; and output a vulnerability fix report containing an identification of the commit and the predicted commit-level vulnerability fix score associated with the commit.

19. The computer readable medium of claim 18, wherein the instructions further cause the system to:

identify, from an embedding vector database, one or more embedding vectors that are most similar to the commit-level code change embedding vector, the one or more identified embedding vectors being associated with respective one or more unique identifiers;

identify, from a known vulnerability fix database, one or more known vulnerability fixes corresponding to the respective one or more unique identifiers; and extract vulnerability fix information for each of the identified one or more known vulnerability fixes from the known vulnerability fix database;

wherein the extracted vulnerability fix information is associated with the commit and included in the vulnerability fix report.

20. The computer readable medium of claim 18, wherein the instructions further cause the system to, prior to obtaining the commit from the code repository:

24 fine-tune the transformer model from the pre-trained language model to generate file-level code change embedding vectors using the training dataset; and after fine-tuning of the transformer model, train the classifier to generate commit-level vulnerability fix scores, including:

using the fine-tuned transformer model to generate training file-level code change embedding vectors from a training sample sampled from the training dataset;

combining the training file-level code change embedding vectors into a training commit-level code change embedding vector;

inputting the training commit level code change embedding vector into the classifier to obtain a training commit-level vulnerability fix score; and updating the classifier based on a loss computed using the training commit-level vulnerability fix score and the ground-truth label associated with the training sample.

* * * * *